United States Patent
Zhang et al.

(10) Patent No.: US 10,028,085 B2
(45) Date of Patent: Jul. 17, 2018

(54) DISTRIBUTED LOCATION DETECTION IN WIRELESS SENSOR NETWORKS

(71) Applicant: AZ Board of Regents, a body corporate of the State of AZ Acting for and on behalf of AZ State University, Scottsdale, AZ (US)

(72) Inventors: Xue Zhang, Mesa, AZ (US); Cihan Tepedelenlioglu, Chandler, AZ (US); Mahesh K. Banavar, Tempe, AZ (US); Andreas Spanias, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 186 days.

(21) Appl. No.: 14/815,344

(22) Filed: Jul. 31, 2015

(65) Prior Publication Data
US 2016/0037294 A1 Feb. 4, 2016

(51) Int. Cl.
*H04W 24/00* (2009.01)
*H04W 4/02* (2018.01)
(Continued)

(52) U.S. Cl.
CPC .............. *H04W 4/02* (2013.01); *H04W 4/006* (2013.01); *H04W 84/18* (2013.01)

(58) Field of Classification Search
CPC ......... H04W 4/23; G01S 3/784; G01S 5/0278
(Continued)

(56) References Cited

U.S. PATENT DOCUMENTS

| 8,818,706 B1 | 8/2014 | Ogale et al. |
| 2010/0177681 A1 | 7/2010 | Sahinoglu |
| | (Continued) | |

OTHER PUBLICATIONS

I.F.Akyildiz et al., "Wireless sensor networks: a survey," Computer Networks, pp. 393-422, 2002.
(Continued)

*Primary Examiner* — Joshua Schwartz
(74) *Attorney, Agent, or Firm* — Byan Cave Leighton Paisner LLP

(57) ABSTRACT

The wireless sensor network can including a plurality of anchor sensors each including a signal receiver, a processing module, and a transmitter. The signal receiver can be configured to detect a received signal. The received signal can include noise and further can include a transmitted signal from the node when the node is transmitting the transmitted signal. The node can be located at an exact location that is unknown to each of the plurality of anchor sensors. The exact location can be in a region that is known to each of the plurality of anchor sensors. The transmitted signal can be wirelessly transmitted from the node when the node is transmitting the transmitted signal. The wireless sensor network also can include a fusion center. The processing module of each anchor sensor of the plurality of anchor sensors can performs acts. The acts can include determining a probability of whether the node is present at each of a plurality of grid points of the region. The acts also can include determining a local detection determination of whether the node is detected by the anchor sensor based at least in part on the probabilities of whether the node is present at the plurality of grid points. The transmitter of each anchor sensor of the plurality of anchor sensors can send the local detection determination from the anchor sensor to the fusion center. Other embodiments are disclosed.

12 Claims, 12 Drawing Sheets

(51) Int. Cl.
 *H04W 84/18* (2009.01)
 *H04W 4/00* (2018.01)
(58) Field of Classification Search
 USPC .......................................... 455/456.1–456.6
 See application file for complete search history.

(56) References Cited

U.S. PATENT DOCUMENTS

| | | | | |
|---|---|---|---|---|
| 2013/0163448 | A1* | 6/2013 | Ruuska | G01S 5/0278 370/252 |
| 2014/0274166 | A1 | 9/2014 | Zhang et al. | |
| 2015/0005000 | A1* | 1/2015 | Gyorfi | H04W 64/006 455/456.1 |

OTHER PUBLICATIONS

G. Sun, J. Chen, W. Guo, and K.J.R. Liu, "Signal pro-cessing techniques in network-aided positioning," IEEE Signal Porcessing Magazine, 2005.
N. Patwari, J.N. Ash, S. Kyperountas, A.O. Hero III, R.L. Moses, and N. S. Correal, "Locating the nodes-cooperative localization in wireless sensor network," IEEE Signal Processing Magazine, vol. 22, No. 4, pp. 54-69, 2005.
N.Patwari, A.O.Herolll, M.Perkins ,N.S.Correal, and R.J. O'Dea, "Relative location estimation in wireless sensor networks," IEEE Transactions on Signal Pro-cessing, vol. 51, No. 8, pp. 2137-2148, 2003.
Y. Qi, H. Kobayashi, and H. Suda, "On time-of-arrival positioning in a multipath environmment," IEEE Trans-actions on Vehicular Technology, vol. 55, No. 5, 2006.
Y. Shen, H. Wymeersch, and M.Z. Win, "Fundamen-tal limits of wideband localization—Part II: cooperative networks," IEEE Transactions on Infromation Theory, vol. 56, No. 10, pp. 4981-5000, Oct. 2010.
T. Jia and R.M. Buehrer, "A new Cramer-Rao lower bound for TOA-based localization," IEEE Military Communications Conference, 2008.
W. Tao, "Cramer-Rao bound for localization with a pri-ori knowledge on biased range measurements," IEEE Transactions on Aerospace and Electronic Systems, vol. 48, No. 1, 2012.
P. Bergamo and G. Mazzini, "Localization in sensor networks with fading and mobility," IEEE Interna-tional Symposium on Personal, Indoor and Mobile Ra-dio Communications, 2002.
S.A. Sattarzadeh and B. Abolhassani, "TOA extraction in multipath fading channels for location estimation," IEEE International Symposium on Personal, Indoor and Mobile Radio Communications Conference, 2006.
H.L. Van Trees, Detection, estimation and modulation Theory, John Wiley and Sons, Inc., 1968.
A.N. Andrea, U. Mengali, and R. Reggiannini, "The modified cramer-rao bound and its application to syn-chronization problems," IEEE Transactions on Commu-nications, vol. 42, No. 234, pp. 1391-1399, 1994.
S. Ray, W.Lai, and I. Paschalidis, "Statistical location detection with sensor networks," IEEE Transactions on Information Theory, vol. 52, No. 6, pp. 2670-2683, 2006.
R. Niu and P.K. Varshney, "Source Localization in Sensor Networks with Rayleigh Faded Signals", IEEE International conference on Acoustics, Speech and Signal Processing (CASSP) 2007, pp. III-1229-III-1232, Apr. 2007.
G. Mao et al., "Localization Algorithms and Strategies for Wireless Sensor Networks", Information Science Reference, 2009.
X. Zhang et al., "CRLB for the localization error in the presence of fading", IEEE International Conference on Acoustics, Speech and Signal Processing (ICASSP), pp. 5150-5154, May 2013.
X. Zhang et al., "Distributed Location Detection in Wireless Sensor Networks", 2013 Asilomar Conference on Signals, Systems and Computers, pp. 428-432, 2014, Nov. 2013.
B. Huang et al., "Analyzing localization errors in one-dimensional sensor networks", Signal Processing, 92, pp. 427-438, 2012.
G. Han et al., "Localization Algorithms of Underwater Wireless Sensor Networks: A Survey", Sensors, 12, pp. 2026-2061, 2012. (Also available from http://www.ncbi.nlm.nih.gov/pmc/articles/PMC3304154/).

* cited by examiner

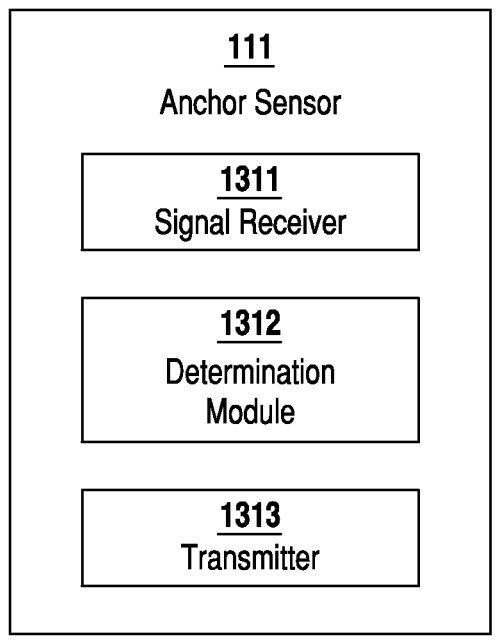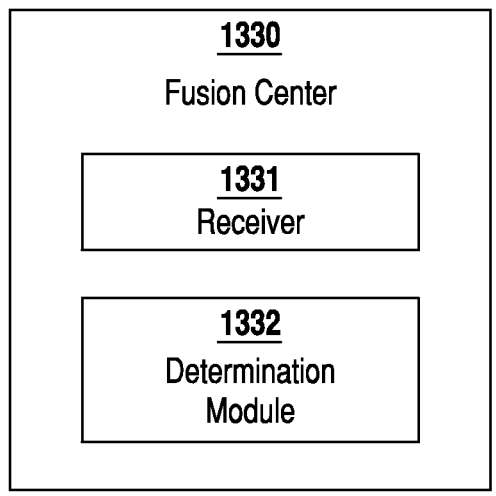
FIG. 13

DISTRIBUTED LOCATION DETECTION IN WIRELESS SENSOR NETWORKS

CROSS-REFERENCE TO RELATED APPLICATIONS

This application claims the benefit of U.S. Provisional Application No. 62/031,355, filed Jul. 31, 2014. U.S. Provisional Application No. 62/031,355 is incorporated herein by reference in its entirety.

TECHNICAL FIELD

This disclosure relates generally to wireless sensor networks, and relates more particularly to distributed location detection in wireless sensor networks.

BACKGROUND

Wireless sensor networks (WSNs) are commonly employed for many applications, including for environmental protection, structural monitoring, and passive localization and tracking A large number of inexpensive sensor nodes with low size, weight and power (SWAP) can be randomly distributed across an area of interest. These nodes operate as transceivers, communicating with one another in an ad-hoc manner, and can be at unknown locations. This is with the exception of a very small number of so-called anchor nodes, which can be at known locations. In commercial applications such as water quality monitoring as well as in military applications such as gunshot detection, an accurate knowledge of the location where an event occurs can be highly beneficial to the users of the system.

In general, location detection can be done using either centralized or distributed methods. Common range-based approaches are time of arrival (TOA), time difference of arrival (TDOA), and received signal strength (RSS). Direction-based approaches include direction of arrival (DOA) estimation techniques implemented by employing antenna arrays at each sensor. Large aperture array (LAA) localization algorithms jointly use direction and range-based information to localize a source by forming a single large aperture array of sensors. In centralized methods, a fusion center (FC) can be used to collect measurements from anchors. Based on these measurements, the FC can make the decision on whether the node is present or not. In distributed methods, each anchor can make its own decision and send the decision to the FC. The FC can collect decisions from anchors and make the final decision based on a design parameter.

BRIEF DESCRIPTION OF THE DRAWINGS

To facilitate further description of the embodiments, the following drawings are provided in which:

FIG. 13 illustrates a block diagram of various components and/or modules of anchor sensor, according to the embodiment of FIG. 1, and a fusion center, according to an embodiment.

Figure 1:
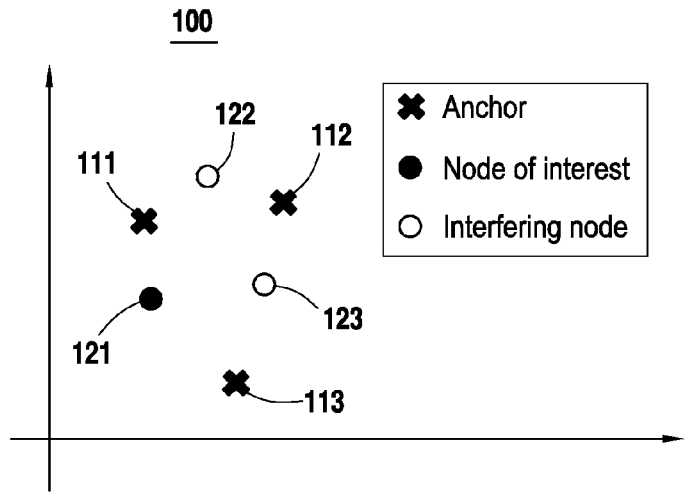
FIG. 1 illustrates a portion of a wireless sensor network system, according to an embodiment.

For simplicity and clarity of illustration, the drawing figures herein illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically or otherwise. Two or more electrical elements may be electrically coupled, but not mechanically or otherwise coupled; two or more mechanical elements may be mechanically coupled, but not electrically or otherwise coupled; two or more electrical elements may be mechanically coupled, but not electrically or otherwise coupled. Coupling (whether mechanical, electrical, or otherwise) may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types. The absence of the word "removably," "removable," and the like near the word "coupled," and the like does not mean that the coupling, etc. in question is or is not removable.

DESCRIPTION OF EXAMPLES OF EMBODIMENTS

Various embodiments include a wireless sensor network system for detecting the location of a node. The wireless sensor network can include a plurality of anchor sensors each including a signal receiver configured to detect a received signal. The received signal can include noise and further can include a transmitted signal from the node when the node is transmitting the transmitted signal. The node can be located at an exact location that is unknown to each of the plurality of anchor sensors. The exact location can be in a region that is known to each of the plurality of anchor sensors. The transmitted signal can be wirelessly transmitted from the node when the node is transmitting the transmitted signal. The plurality of anchor sensors each also can include a processing module and a transmitter. The wireless sensor network also can include a fusion center. The processing module of each anchor sensor of the plurality of anchor sensors can performs acts. The acts can include determining a probability of whether the node is present at each of a plurality of grid points of the region. The acts also can include determining a local detection determination of whether the node is detected by the anchor sensor based at least in part on the probabilities of whether the node is present at the plurality of grid points. The transmitter of each anchor sensor of the plurality of anchor sensors can send the local detection determination from the anchor sensor to the fusion center.

A number of embodiments include a method for detecting the location of a node. The method can include receiving, at each of a plurality of anchor sensors, a received signal. The received signal can include noise and further can include a transmitted signal from the node when the node is transmitting the transmitted signal. The node can be located at an exact location that is unknown to each of the plurality of anchor sensors. The exact location can be in a region that is known to each of the plurality of anchor sensors. The transmitted signal can be wirelessly transmitted from the node when the node is transmitting the transmitted signal. The method also can include determining, at each of the plurality of anchor sensors, a probability of whether the node is present at each of a plurality of grid points of the region. The method additionally can include determining, at each of the plurality of anchor sensors, a local detection determination of whether the node is detected by the anchor sensor based at least in part on the probabilities of whether the node is present at the plurality of grid points. The method further can include transmitting the local detection determination from each of the plurality of anchor sensors to a fusion center.

Additional embodiments include a method for detecting the location of a node in the presence of one or more interfering nodes. The method can include receiving, at each of a plurality of anchor sensors, a received signal. The received signal comprising noise and further comprising one of (a) a transmitted signal from the node when the node is transmitting the transmitted signal or (b) an interfering signal when the one of the one or more interfering nodes is transmitting. The node can be located at an exact location that is known to each of the plurality of anchor sensors. The one or more interfering nodes each can be located at an unknown location. The method also can include determining, at each of the plurality of anchor sensors, a local detection determination of whether the node is detected by the anchor sensor, which can include detecting whether one of the node or the one of the one or more interfering nodes is transmitting. If the one of the node or the one of the one or more interfering nodes is not detected to be transmitting, the method can include determining the local detection determination to be that the node is not detected. If the one of the node or the one of the one or more interfering nodes is detected to be transmitting, the method can include differentiating between whether the node is transmitting or the one of the one or more interfering nodes is transmitting, based on an estimated time delay. If the node is detected to be transmitting, the method can include determining the local detection determination to be that the node is detected. If the one or more one or more interfering nodes is detected to be transmitting, the method can include determining the local detection determination to be that the node is not detected. The method further can include transmitting the local detection determination from each of the plurality of anchor sensors to a fusion center.

In some embodiments, a WSN with M anchors and one node can be provided. The detection can be based on TOA. In one condition, the node does not transmit, and each anchor receives pure noise. In another condition, the node transmits a sequence of signals to each anchor, and each anchor receives signal plus noise. In the presence of the transmitting node at a known location, each anchor can receive a noisy signal in the presence of node. In the absence of the node, the anchors can receive only noise. Each anchor can make a decision as to whether the node is present or not by using a Neyman-Pearson detector. The bit denoting the decision can be transmitted to an FC. If an anchor detects the node, a bit "1" can be sent; otherwise, a bit "0" can be sent. The FC can count the number of "1"s and "0" s, and can declare the node present if it receives at least K "1"s from the anchors, where K≤M can be a design parameter. In additional embodiments, a WSN can detect a node in a known region, and/or detect one node of interest with multiple interfering nodes. In comparison to the centralized location detection scheme, the distributed scheme can benefit from both time and energy efficiency. Simulation results show that the choice of the design parameter K depends on the requirement of the overall probability of false alarm.

In a number of embodiments, localization in WSNs can be formulated as both location detection and estimation problems. In the estimation formulation, one or more nodes at unknown locations can transmit signals to anchors, and anchors can make distance related measurements, using techniques such as TOA and RSS, or angle related measurements, such as angle of arrival (AOA) to locate the node. In location detection, the goal can be to determine the presence or absence of a node in a known location, or more generally at an unknown location in a known region. More so than location estimation, the detection problem lends itself to a distributed implementation based on exchange of bits between the anchors and an FC. Moreover, in some cases, location detection can require fewer anchors to detect a node at a given location when compared to location estimation. If a node is present at a known location, anchors can declare that the node exists based on a threshold. On the other hand, if a node is at an unknown location, detection of the node location can be formulated as a composite hypothesis testing problem, in which case estimation theory can be applied to find the maximum likelihood estimates (MLE) of unknown parameters.

In many embodiments, a distributed location detection scheme can be provided where one node, when present, is at a known location. In this system, each anchor can make its own decision on whether the node is present at a given location, and can transmits the decision by sending a bit to an FC. The FC can decide if the node is present based on the number of anchors reporting a "detect." In other embodiments, one node can be at an unknown deterministic location in a known region, such as detecting a node in a room. The region can be discretized to set a grid. The location of the node can be deterministic rather than random. A threshold can be chosen at each anchor rather than maximizing the Chernoff distance between all possible distributions. Each anchor can determine the presence of the node and transmit a single bit to the FC, which can beneficially reduce bandwidth and power usage, and simplify the processing at the FC.

In other embodiments, multiple nodes may be involved. In some embodiments, the node location can be detected when interfering nodes exists. In some such embodiments, there can be only one node of interest, but each anchor may receive unexpected signals from interfering nodes located in unknown locations.

In many embodiments, the distributed detection scheme can be different from the centralized methods in the way that the FC only collects binary data sent by each anchor rather than the actual measurements made by anchors. The distributed detection scheme also has benefits in terms of power and time efficiency.

System Model

A sensor network with M anchors and one node can be provided. The node can transmit a signal to each anchor, and each anchor can make distance related measurements to the node. Each anchor can make N independent and identically distributed (i.i.d) measurements, and can correlate the received signal with the transmitted signal. The measured time delay can then be found by identifying the lag corresponding to the correlation peak occurs. To detect the node, a binary hypothesis testing problem at each anchor can be formulated as $$x_i[n] = \begin{cases} w_i[n] & \text{under } H_0 \\ s_i[n - n_0^i] + w_i[n] & \text{under } H_1 \end{cases}, \quad (1)$$

where $s_i[n]$ is the transmitted signal from the node, which can be deterministic and can have the length of L. The true time delay between the node and the ith anchor is denoted as $n_0^i$, where i=1,2, . . . , M; n=0,1, . . . , N−1 is the measurement index, and $\omega_i[n]$ is additive Gaussian noise with zero mean and variance $\sigma^2$. If the $i^{th}$ anchor detects the node, it can transmit a bit "1" to a FC. Otherwise a bit "0" can be transmitted. After the FC receives M bits, it can count the number of "1"s and "0"s. In some embodiments, the FC can need at least K anchors indicating $H_1$ to declare the node present.

Locating a Node of Interest at a Known Location

The node location can be known to each anchor. Therefore $n_0^i$ in (1) can be known. Based on Neyman-Pearson theorem, the $i^{th}$ anchor can detect the node if the likelihood ratio $T_i(x)$ satisfies $$\ln T_i(x) = \ln \frac{p(x; H_1)}{p(x; H_0)} > \gamma. \quad (2)$$

Here, $p(x; H_1)$ is the probability density function (pdf) of the received signal under $H_1$, where x=[x[0], x[1], . . . , x[N−1]]. Similarly, $p(x; H_0)$ is the pdf of x under $H_0$. In many embodiments, $\gamma$ can be a detection threshold that is a design parameter. After simplifications, $T_i(x)$ can be expressed as $$T_i(x) = \prod_{n=n_0^i}^{n_0^i+L-1} \exp\left[\frac{1}{\sigma^2} x_i[n] s_i[n - n_0^i]\right] \times \exp\left[-\frac{1}{2\sigma^2} s_i^2[n - n_0^i]\right]. \quad (3)$$

Taking the logarithm of (3), the $i^{th}$ anchor can detect the node if $$\ln T_i(x) = \sum_{n=n_0^i}^{n_0^i+L-1} x_i[n] s_i[n - n_0^i] > \frac{\varepsilon}{2} + \sigma^2 \ln \gamma' \quad (4)$$

where $\varepsilon$ is the energy of the transmitted signal and can be the same for all anchors. Then the sound-to-noise ratio (SNR) of the transmitted signal can be found by $$SNR = \frac{\varepsilon}{\sigma^2 N}.$$

The distribution of $\ln T_i(x)$ in (4) under $H_0$ and $H_1$ are $$\ln T_i(x) = \begin{cases} N(0, \sigma^2 \varepsilon) & \text{under } H_0 \\ N(\varepsilon, \sigma^2 \varepsilon) & \text{under } H_1 \end{cases}. \quad (5)$$

Let $$\gamma = \frac{\varepsilon}{2} + \sigma^2 \ln \gamma',$$

then the probability of false alarm at the $i^{th}$ anchor $P_{FA}^i$ is $$P_{FA}^i = Pr\{\ln T_i(x) > \gamma; H_0\} = Q\left(\frac{\gamma}{\sqrt{\sigma^2 \varepsilon}}\right), \quad (6)$$

and the probability of detection at the $i^{th}$ anchor $P_D^i$, is $$P_D^i = Pr\{\ln T_i(x) > \gamma; H_1\} = Q\left(\frac{\gamma - \varepsilon}{\sqrt{\sigma^2 \varepsilon}}\right). \quad (7)$$

Therefore, for given $P_{FA}^i$, $P_D^i$, can be found by $$\gamma = Q\left(Q^{-1}(P_{FA}^i) - \sqrt{\frac{\varepsilon}{\sigma^2}}\right). \quad (8)$$

In some embodiments, the FC can need at least K anchors to declare $H_1$ and decide that the node exists at the given location. There can be a total of $S = \binom{M}{K} + \binom{M}{K+1} + \ldots + \binom{M}{M}$ combinations that satisfy the decision rule and detect the node successfully. The overall probability of false alarm, which is denoted as $\overline{P}_{FA}$ and the overall probability of detection, which is denoted as $\overline{P}_D$, are given by $$\overline{P}_{FA} = \sum_{m=K}^{M} \binom{M}{m}(P_{FA}^i)^m(1 - P_{FA}^i)^{M-m}, \text{ and} \quad (9)$$

$$\overline{P}_D = \sum_{m=K}^{M} \binom{M}{m}(P_D^i)^m(1 - P_D^i)^{M-m}. \quad (10)$$

For a given $\overline{P}_{FA}$ and K, and assuming $\gamma$ is the same for all anchors, the optimal threshold $\gamma$ can be found by solving (9) for $\overline{P}_{FA}$ and substituting into (8).

Because each anchor can use the same threshold $\gamma$, $P_{FA}^1 = P_{FA}^2 = \ldots = P_{FA}^M$. Similarly, $P_D^1 = P_D^2 = \ldots = P_D^M$. From (9) and (10), as K increases, both $\overline{P}_{FA}$ and $\overline{P}_D$ can decrease.

Locating a Node in a Known Region

In many embodiments, the node location may not be known to the anchors. Instead, a region that contains the node can be known. In these embodiments, one node can be located in a known region with an unknown deterministic location. The hypothesis testing problem can be formulated as (1) with $n_0^i$ as an unknown deterministic parameter. One way to solve the problem is to discretize the region and represent it using a grid. Let $\Re = \{1, 2, \ldots, R\}$ be a set of indices corresponding to these grid locations. Each anchor can test all the possible locations in $\Re$ and can declare the node present if it detects the node in at least one possible location. Therefore, the hypothesis detection problem at the $i^{th}$ anchor for the $j^{th}$ possible location can be formulated as $$x_i[n] = \begin{cases} \omega_i[n] & \text{under } H_0 \\ s_i[n - n_j^i] + \omega_i[n] & \text{under } H_1 \end{cases}, \quad (11)$$

where $n_j^i$ is the true time delay between the $i^{th}$ anchor and the $j^{th}$ possible location, and $j \in \Re$.

$P_{FA}^j$ can be defined as the probability of false alarm at the $j^{th}$ possible location, such that $P_{FA}^i$ can be calculated as $$P_{FA}^i = 1 - (1 - P_{FA}^j)^R. \quad (12)$$

$P_D^j$ can be defined as probability of detection at the $j^{th}$ possible location, such that $P_D^i$ can be calculated as $$P_D^i = 1 - (1 - P_D^j)^R. \quad (13)$$

Here, $P_{FA}^j$ and $P_D^j$ can be calculated by using (6) and (7). The FC can use the same decision rule as described above, namely that the FC can need at least K anchors to declare $H_1$ and decide that the node exists in the known region. The overall $\overline{P}_{FA}$ and $\overline{P}_D$ can be calculated using (9) and (10) respectively.

Locating One Node of Interest Involving Multiple Interfering Nodes

In some embodiments, anchors can receive unexpected interference from nodes other than the node of interest. In some embodiments, the one node of interest can be located in the presence of one or more interfering nodes. FIG. 1 shows an example of a portion of a wireless sensor network system 100, which can include three anchors and three nodes, namely anchor sensors 111, 112, and 113, and sensor node devices 121, 122, and 123. In many embodiments, only one of these nodes, such as sensor node device 121, can be the node of interest, and nodes 122-123 can be interfering nodes. If there is at most one node transmitting during the observation time, the multiple hypothesis detection problem can be formulated as $$H_0: x_i[n] = \begin{cases} \omega_i[n] \\ s_i[n - n_j^i] + \omega_i[n] \end{cases} \quad (14)$$

$$H_1: x_i[n] = s_i[n - n_0^i] + \omega_i[n],$$

where $n_0^i$ is the time delay between the $i^{th}$ anchor and the node of interest, which is known to the $i^{th}$ anchor. $n_j^i$ is the time delay between the $i^{th}$ anchor and the $j^{th}$ node, where $j = 1, 2, \ldots, Z$ corresponding to Z possible locations for the interfering node. Because anchors often do not have the knowledge of all other nodes, $n_j^i$ can be a deterministic unknown parameter.

Figure 2:
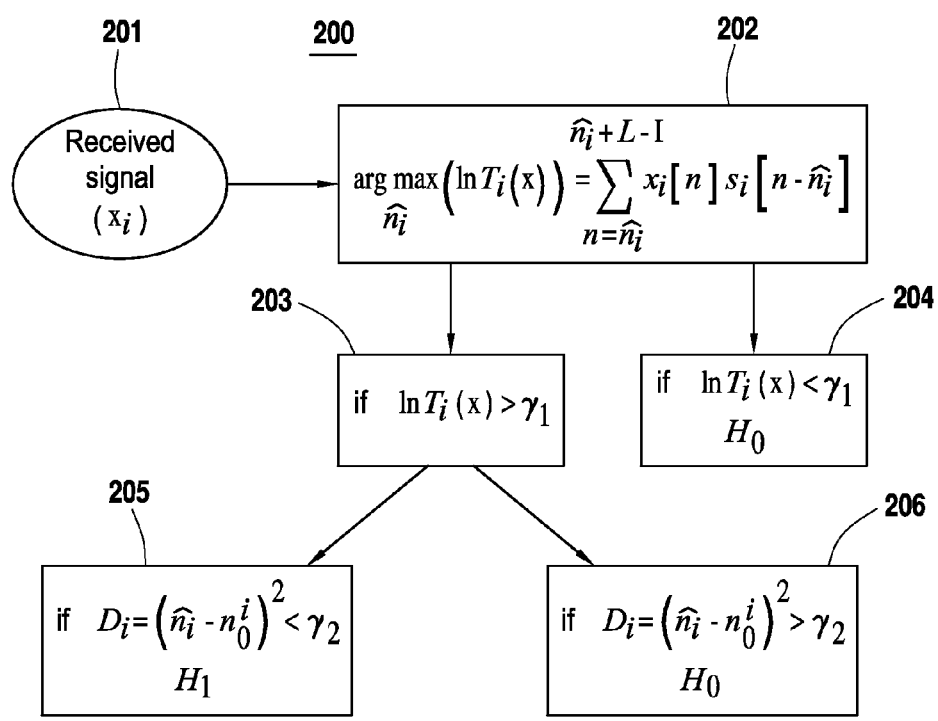
FIG. 2 illustrates a detection procedure at an anchor, according to an embodiment.

In a number of embodiments, a two-step binary hypothesis testing structure can be used. FIG. 2 shows a detection procedure 200 at the $i^{th}$ anchor, according to an embodiment. Detection procedure 200 is merely exemplary and is not limited to the embodiments presented herein. Procedure 200 can be employed in many different embodiments or examples not specifically depicted or described herein. In some embodiments, the procedures, the process, and/or the activities of procedure 200 can be performed in the order presented. In other embodiments, the procedures, the processes, and/or the activities of procedure 200 can be performed in any suitable order. In still other embodiments, one or more of the procedures, the processes, and/or the activities of procedure 200 can be combined or skipped. In many embodiments, procedure 200 can be performed by the $i^{th}$ anchor, such as one of anchor sensors 111-113 (FIG. 1). In many embodiments, procedure 200 can be performed by each of anchor sensors 111-113 (FIG. 1).

In many embodiments, procedure 200 can include a block 201 of receiving a received signal ($x_i$). As explained above, the received signal can include a transmitted signal from a node, such as sensor node device 121 (FIG. 1), and/or Gaussian noise.

In several embodiments, procedure 200 also can include a block 202 of the $i^{th}$ anchor detecting if any node is transmitting. Similar to the single node detection procedure described above, the anchor can declare there is a node transmitting if the correlation of the received signal and the transmitted signal satisfies $$\ln T_i(x) = \sum_{n=\hat{n}_i}^{\hat{n}_i+L-1} x_i[n]s_i[n-\hat{n}_i] > \gamma_1. \quad (15)$$

If the threshold is exceeded and a transmitted signal from a node was received, then at a block 203 of procedure 200, the delay $\hat{n}_i$ can be estimated to determine if the transmitted signal received was from the node of interest or instead from an interfering node. Otherwise, if the threshold is not exceeded, at a block 204 of procedure 200, $H_0$ can be decided. Returning to block 203, the $i^{th}$ anchor can compare the estimated time delay $\hat{n}_i$ with $n_0^i$, and at a block 205 of procedure 200, can decide $H_1$ is true if $$D_j^i = (n_0^i - \hat{n}_i)^2 < \gamma_2. \quad (16)$$

Otherwise, at a block 206 of procedure 200, the $i^{th}$ anchor can decide $H_0$. In many embodiments, the $i^{th}$ anchor can transmit $H_0$ or $H_1$ to the FC. In many embodiments, the FC can use the same decision rule as in the previous sections. In many embodiments, $\gamma_1$ and $\gamma_2$ can be design parameters, which can be varied, and can be application dependent.

Embodiments with interfering nodes can be more complicated in the sense that they can involve multiple thresholds at each anchor. For a fixed $\gamma_2$, when $\gamma_1$ is higher, the total $\overline{P}_{FA}$ and $\overline{P}_D$ at the $i^{th}$ anchor can be lower. On the other hand, for a fixed $\gamma_1$, as $\gamma_2$ goes higher, $\overline{P}_{FA}^i$ and $\overline{P}_D^i$ can increase. Therefore, for a fixed K and $P_{FA}$, in order to increase $P_D$, one can lower $\gamma_1$ and increase $\gamma_2$.

Simulation Results

Simulations can examine a sensor network with four anchors in each corner of a 1 meter (m) by 1 m square, with one node in the center of the square, when present. A Neyman-Pearson detector can be used to detect the presence of the node. Each anchor can make its own decision and a bit "1" or "0" can be transmitted to a FC. The FC can count the number of "1"s. If the total number of "1"s is greater than or equal to K, then the FC will declare the node exists. For the simulations, results can be obtained for all cases of K={1,2,3,4}. N can be set to 20 and SNR can be 10 dB for all simulations, using Monte Carlo simulations.

Figure 3:
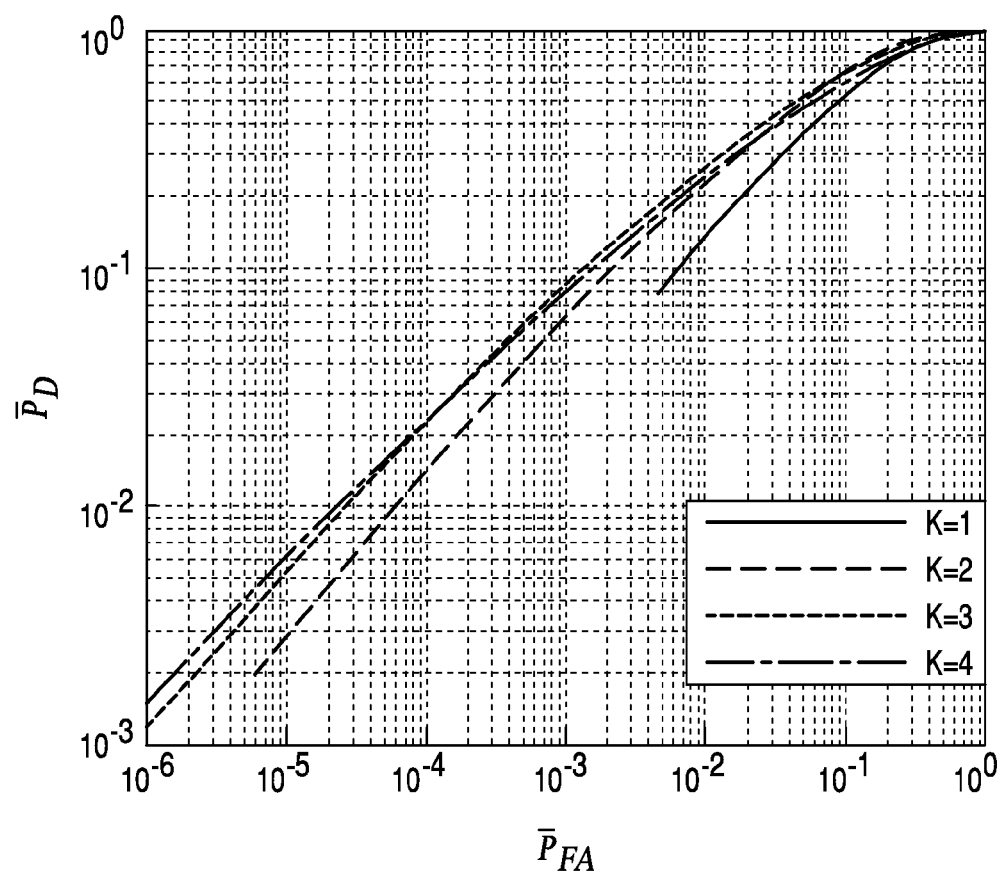
FIG. 3 illustrates receiver operating characteristic (ROC) curves for different K values for detecting a node at a known location, according to an embodiment.

FIG. 3 shows the receiver operating characteristic (ROC) curves for different K values for detecting a node at a known location. FIGS. 3-8 are shown on a log-log scale. FIG. 3 shows that K=4 is not always the best choice for all $\overline{P}_{FA}$. When $\overline{P}_{FA}$ is smaller than $10^{-3}$, K=4 can be selected. However, for high $\overline{P}_{FA}$ regime, the performance of all other K values exceed the performance of K=4, then K=4 is not a good choice. Intuitively speaking, to make $\overline{P}_{FA}$ close to 0, more anchors are needed to avoid Type I errors. However, as $\overline{P}_{FA}$ increases, the system is more tolerant to Type I errors, therefore less anchors are needed to achieve a given $\overline{P}_{FA}$.

Figure 4:
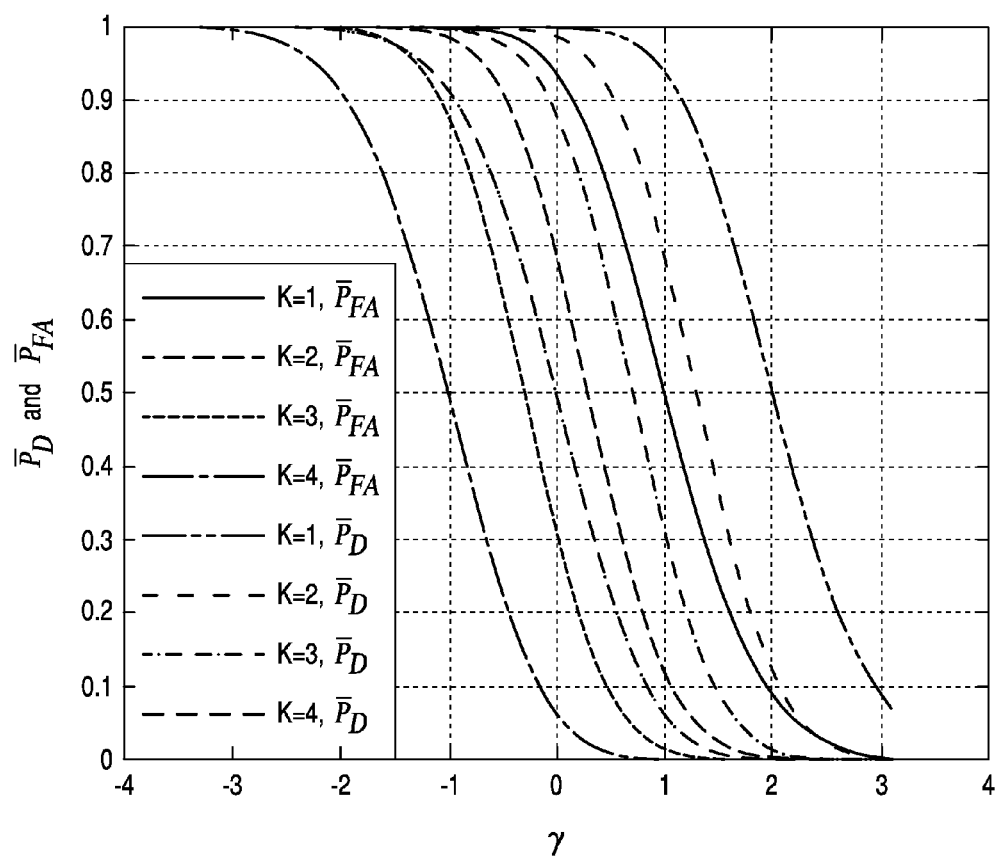
FIG. 4 illustrates the $\overline{P}_D$ and $\overline{P}_{FA}$ for different values of threshold γ, and for different values of K, according to an embodiment.

FIG. 4 shows the $\overline{P}_D$ and $\overline{P}_{FA}$ for different values of threshold $\gamma$, and for different values of K. In both cases, given the same $\gamma$, as K increases, $\overline{P}_D$ and $\overline{P}_{FA}$ decrease, as expected from (9) and (10).

Figure 5:
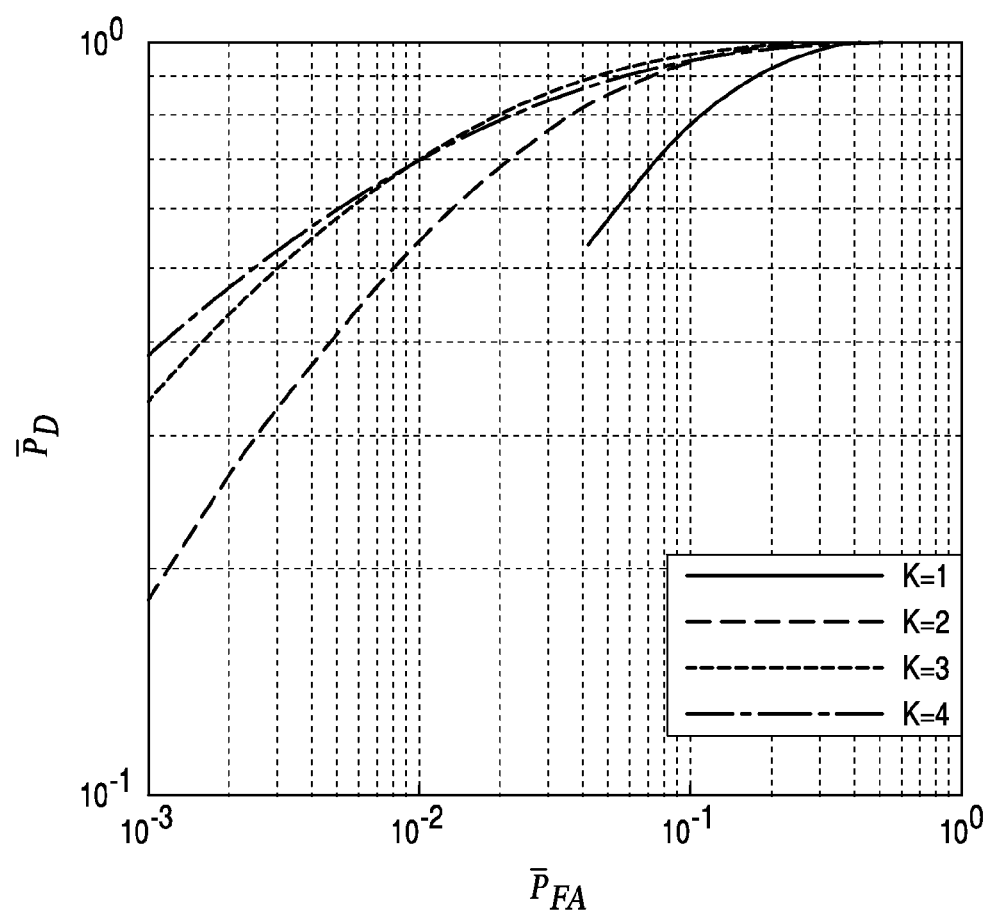
FIG. 5 illustrates a plot of the ROC curve for location detection in a known region for different values of K, according to an embodiment.

Next, simulations can examine location detection in a known region case. In this case, region can be a 1 m by 1 m square. Four anchors can be placed in each corner of the square. The node can be placed in the center of the square but unknown to the anchors. The grid size can be set as R=10. FIG. 5 shows a plot of the ROC curve for location detection in a known region for different values of K. Similarly to FIG. 3, K=4 is not always the best choice for all $\overline{P}_{FA}$.

Figure 6:
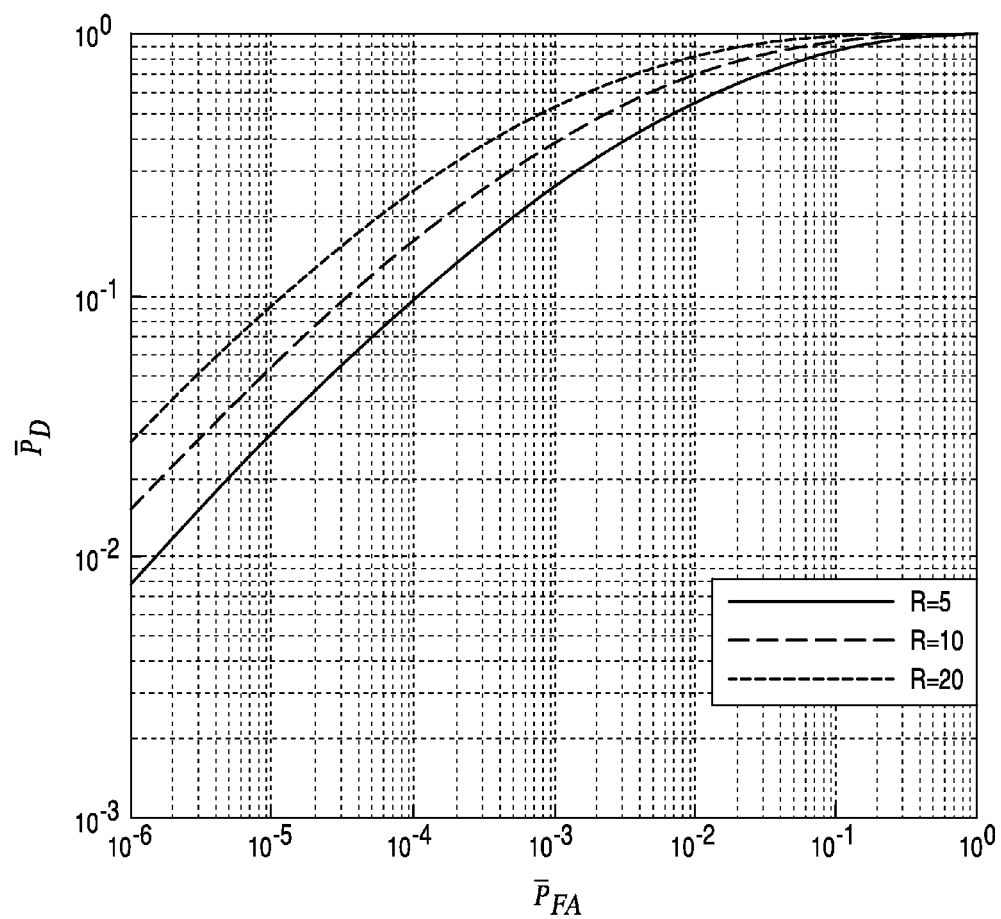
FIG. 6 illustrates the ROC curve for different grid sizes when fixing K=4, according to an embodiment.

FIG. 6 shows the ROC curve for different grid sizes when fixing K=4. FIG. 6 shows that as R increases, $\overline{P}_D$ becomes larger for a given $\overline{P}_{FA}$.

Figure 7:
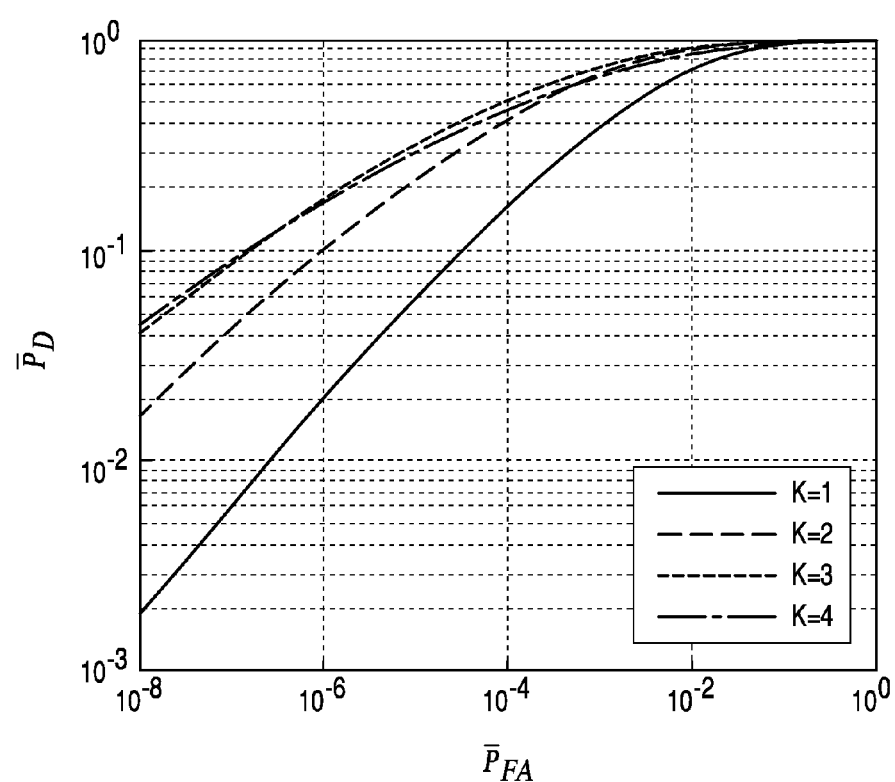
FIG. 7 illustrates the ROC curve for location detection involving multiple nodes, according to an embodiment.

Simulations also can examine detection involving multiple nodes. In this case, M can be set to 4 anchors in each corner of a 1 m by 1 m square, and two nodes can be inside the square. The node of interest can be located in the center of the square. The interfering node can have the Cartesian coordinate (0.1, 0.1). FIG. 7 shows the ROC curve for location detection involving multiple nodes. As shown in FIG. 7, the choice of K can depend on $\overline{P}_{FA}$.

Figure 8:
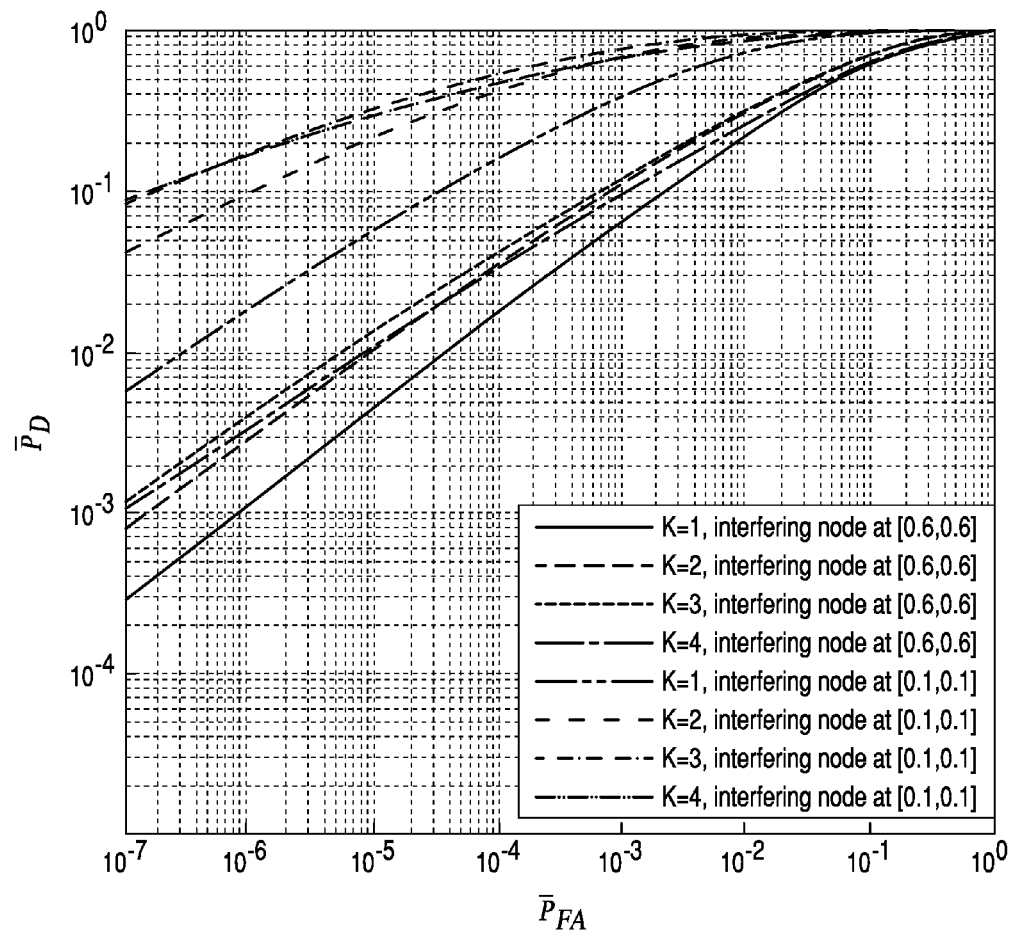
FIG. 8 illustrates a performance comparison when the interfering node is placed at (0.1, 0.1), and then at (0.6, 0.6), and the node of interest is fixed, in both cases, at (0.5, 0.5), according to an embodiment.

The performance also can be compared when the interfering node is close and far away from the node of interest. FIG. 8 shows a performance comparison when the interfering node is placed at (0.1, 0.1), and then at (0.6, 0.6), and the node of interest is fixed, in both cases, at (0.5, 0.5). FIG. 8 shows that when the interfering node is closer to the node of interest, the performance can become worse. This is because when the interfering node is close to the node of interest, it is more likely for each anchor to declare the node of interest present when one of the interfering nodes is transmitting.

Embodiments of a distributed location detection scheme in WSNs are described herein. The described scheme can be different from centralized location detection schemes because each anchor can make its own decision of whether the node is present and can transmit a binary bit to a FC. The FC can need at least K anchors to agree that the node exists to detect the presence of the node. The described scheme can be more power- and time-efficient than centralized methods. Simulation results show that the optimum choice of K can depend on the requirements of $\overline{P}_{FA}$ and $\overline{P}_D$. In low $\overline{P}_{FA}$, K=4 can be the best choice. However, as $\overline{P}_{FA}$ becomes higher, K=4 can be not a good choice. Therefore, none of the K values outperform others for all $\overline{P}_{FA}$.

In some embodiments, the distributed location detection techniques described above can be used in a cellular or wireless data communication network, where base station receivers are known anchors, and devices, such as mobile phones, can be nodes with a known precise location or a known location within a region. The techniques can be used for event detection, such as fire detection and intrusion warning. By using distributed location detection methods, in some embodiments, the FC does not need to collect all measurement data, which can beneficially be more efficient. The reduced data transmitted can improve efficiency and reduce power and bandwidth requirements. This also can extend to detection of a node at a random location in a given area. The possibility of detecting an event with the target node at a random location in an area also means that the installation of the devices can be easier.

Figure 9:
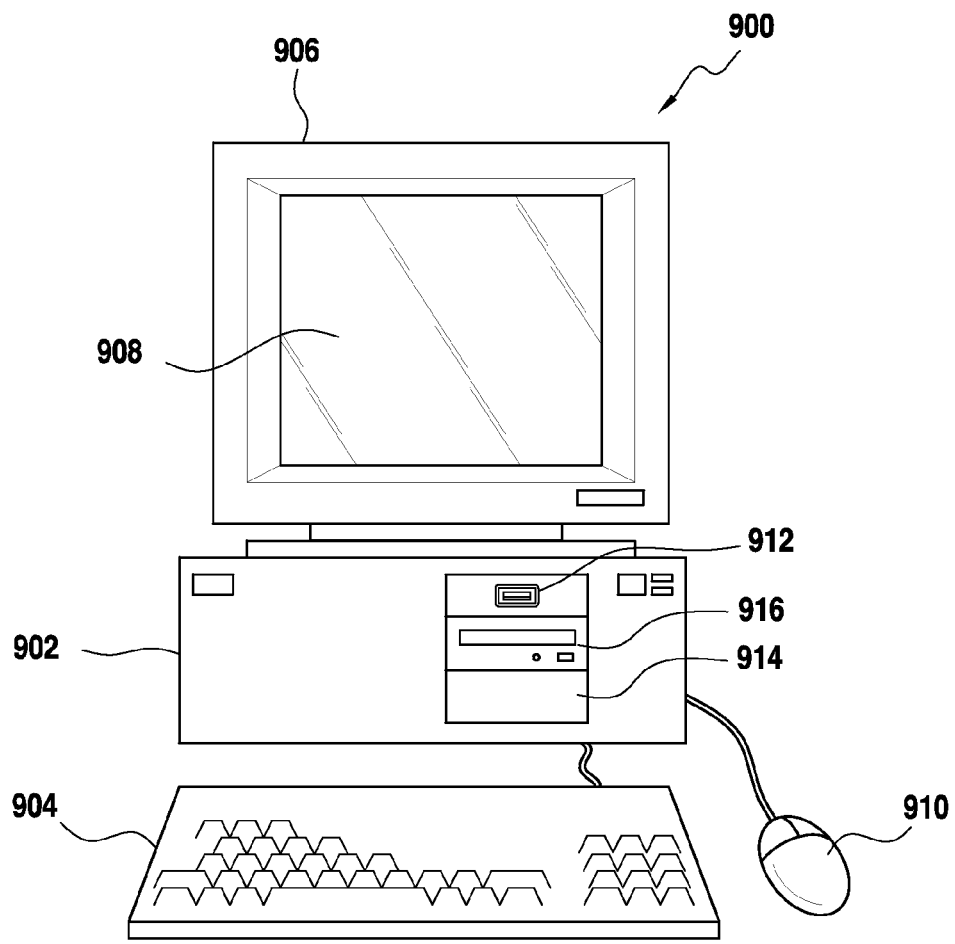
FIG. 9 illustrates a computer system that is suitable for implementing an embodiment of the anchor sensors of FIG. 1 and/or the fusion center of FIG. 13.
Figure 10:
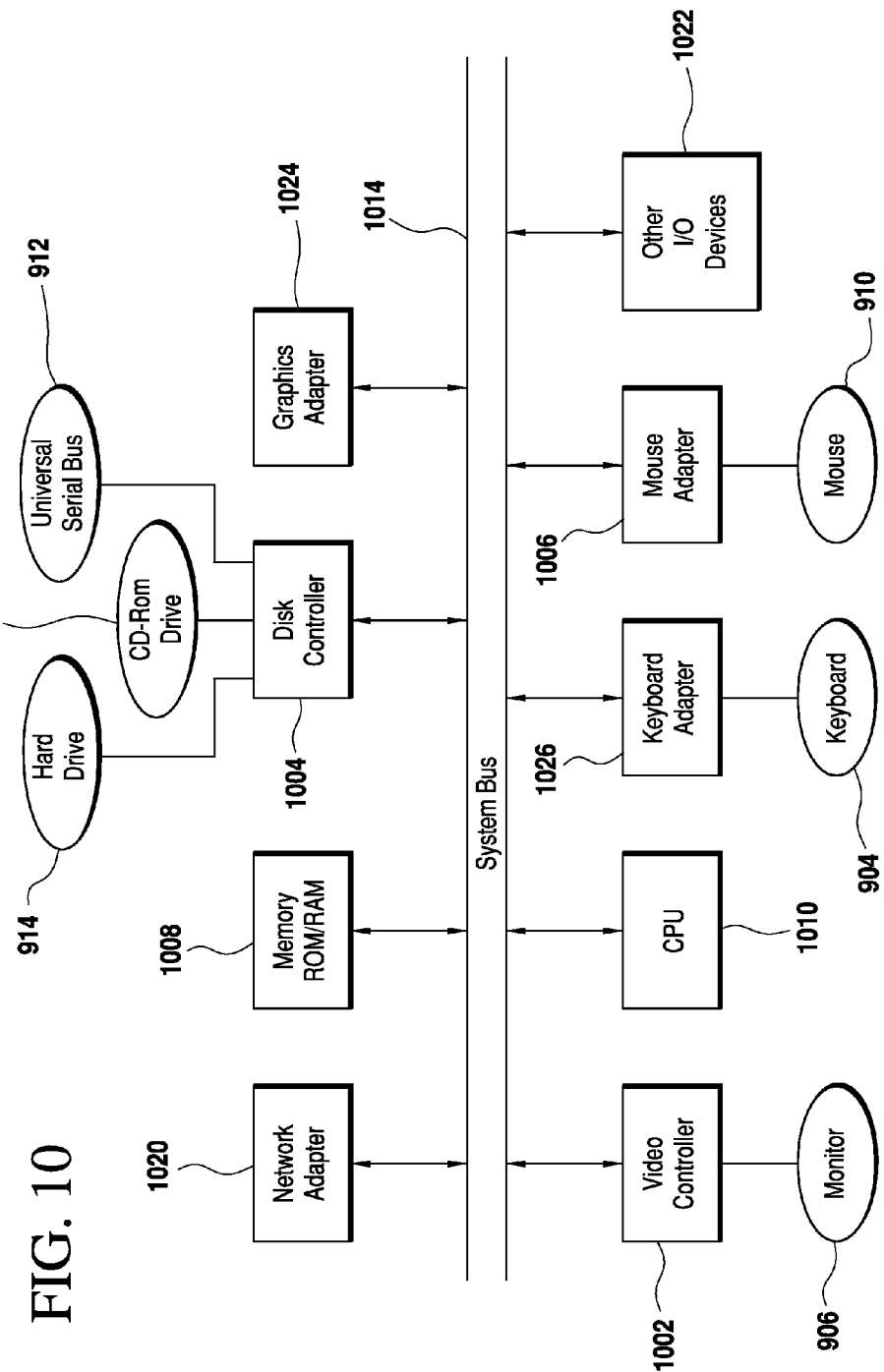
FIG. 10 illustrates a representative block diagram of an example of the elements included in the circuit boards inside a chassis of the computer system of FIG. 9.

Turning to the next drawing, FIG. 9 illustrates an exemplary embodiment of computer system 900, all of which or a portion of which can be suitable for implementing the techniques described herein and/or an embodiment of anchor sensor 111 (FIG. 1), anchor sensor 112 (FIG. 1), anchor sensor 113 (FIG. 1), and/or fusion center 1330 (FIG. 13, described below). As an example, a different or separate one of chassis 902 (and its internal components) can be suitable for implementing the techniques described herein. Furthermore, one or more elements of computer system 900 (e.g., refreshing monitor 906, keyboard 904, and/or mouse 910, etc.) can also be appropriate for implementing the techniques described herein. Computer system 900 comprises chassis 902 containing one or more circuit boards (not shown), Universal Serial Bus (USB) port 912, Compact Disc Read-Only Memory (CD-ROM) and/or Digital Video Disc (DVD) drive 916, and hard drive 914. A representative block diagram of the elements included on the circuit boards inside chassis 902 is shown in FIG. 10. Central processing unit (CPU) 1010 in FIG. 10 is coupled to system bus 1014 in FIG. 10. In various embodiments, the architecture of CPU 1010 can be compliant with any of a variety of commercially distributed architecture families.

Continuing with FIG. 10, system bus 1014 also is coupled to memory storage unit 1008, where memory storage unit 1008 comprises both read only memory (ROM) and random access memory (RAM). Non-volatile portions of memory storage unit 1008 or the ROM can be encoded with a boot code sequence suitable for restoring computer system 900 (FIG. 9) to a functional state after a system reset. In addition, memory storage unit 1008 can comprise microcode such as a Basic Input-Output System (BIOS). In some examples, the one or more memory storage units of the various embodiments disclosed herein can comprise memory storage unit 1008, a USB-equipped electronic device, such as, an external memory storage unit (not shown) coupled to universal serial bus (USB) port 912 (FIGS. 9-10), hard drive 914 (FIGS. 9-10), and/or CD-ROM or DVD drive 916 (FIGS. 9-10). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise Microsoft® Windows® operating system (OS), Mac® OS, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 1010.

In the depicted embodiment of FIG. 10, various I/O devices such as disk controller 1004, graphics adapter 1024, video controller 1002, keyboard adapter 1026, mouse adapter 1006, network adapter 1020, and other I/O devices 1022 can be coupled to system bus 1014. Keyboard adapter 1026 and mouse adapter 1006 are coupled to keyboard 904 (FIGS. 9-10) and mouse 910 (FIGS. 9-10), respectively, of computer system 900 (FIG. 9). While graphics adapter 1024 and video controller 1002 are indicated as distinct units in FIG. 10, video controller 1002 can be integrated into graphics adapter 1024, or vice versa in other embodiments. Video controller 1002 is suitable for refreshing monitor 906 (FIGS. 9-10) to display images on a screen 908 (FIG. 9) of computer system 900 (FIG. 9). Disk controller 1004 can control hard drive 914 (FIGS. 9-10), USB port 912 (FIGS. 9-10), and CD-ROM drive 916 (FIGS. 9-10). In other embodiments, distinct units can be used to control each of these devices separately.

In some embodiments, network adapter 1020 can comprise and/or be implemented as a WNIC (wireless network interface controller) card (not shown) plugged or coupled to an expansion port (not shown) in computer system 900 (FIG. 9). In other embodiments, the WNIC card can be a wireless network card built into computer system 900 (FIG. 9). A wireless network adapter can be built into computer system 900 by having wireless communication capabilities integrated into the motherboard chipset (not shown), or implemented via one or more dedicated wireless communication chips (not shown), connected through a PCI (peripheral component interconnector) or a PCI express bus of computer system 900 (FIG. 9) or USB port 912 (FIG. 9). In other embodiments, network adapter 1020 can comprise and/or be implemented as a wired network interface controller card (not shown).

Although many other components of computer system 900 (FIG. 9) are not shown, such components and their interconnection are well known to those of ordinary skill in the art. Accordingly, further details concerning the construction and composition of computer system 900 and the circuit boards inside chassis 902 (FIG. 9) are not discussed herein.

When computer system 900 in FIG. 9 is running, program instructions stored on a USB-equipped electronic device connected to USB port 912, on a CD-ROM or DVD in CD-ROM and/or DVD drive 916, on hard drive 914, or in memory storage unit 1008 (FIG. 10) are executed by CPU 1010 (FIG. 10). A portion of the program instructions, stored on these devices, can be suitable for carrying out at least part of the techniques described herein. In various embodiments, computer 700 can be reprogrammed with one or more modules, applications, and/or databases to convert a general purpose computer to a special purpose computer.

Although computer system 900 is illustrated as a desktop computer in FIG. 9, there can be examples where computer system 900 may take a different form factor while still having functional elements similar to those described for computer system 900. In some embodiments, computer system 900 may comprise a single computer, a single server, or a cluster or collection of computers or servers, or a cloud of computers or servers. Typically, a cluster or collection of servers can be used when the demand on computer system 900 exceeds the reasonable capability of a single server or computer. In certain embodiments, computer system 900 may comprise a portable computer, such as a laptop computer. In certain other embodiments, computer system 900 may comprise a mobile device, such as a smart phone. In certain additional embodiments, computer system 900 may comprise an embedded system. In a number of embodiments, computer system 900 can communicate using a wireless communications protocol, such as Wi-Fi (wireless fidelity, the IEEE (Institute of Electrical and Electronics Engineers) 802.11 standard), Zigbee (IEEE 802.15.4), Bluetooth (IEEE 802.15.1), or another suitable protocol, such as a proprietary data communication protocol.

Figure 11:
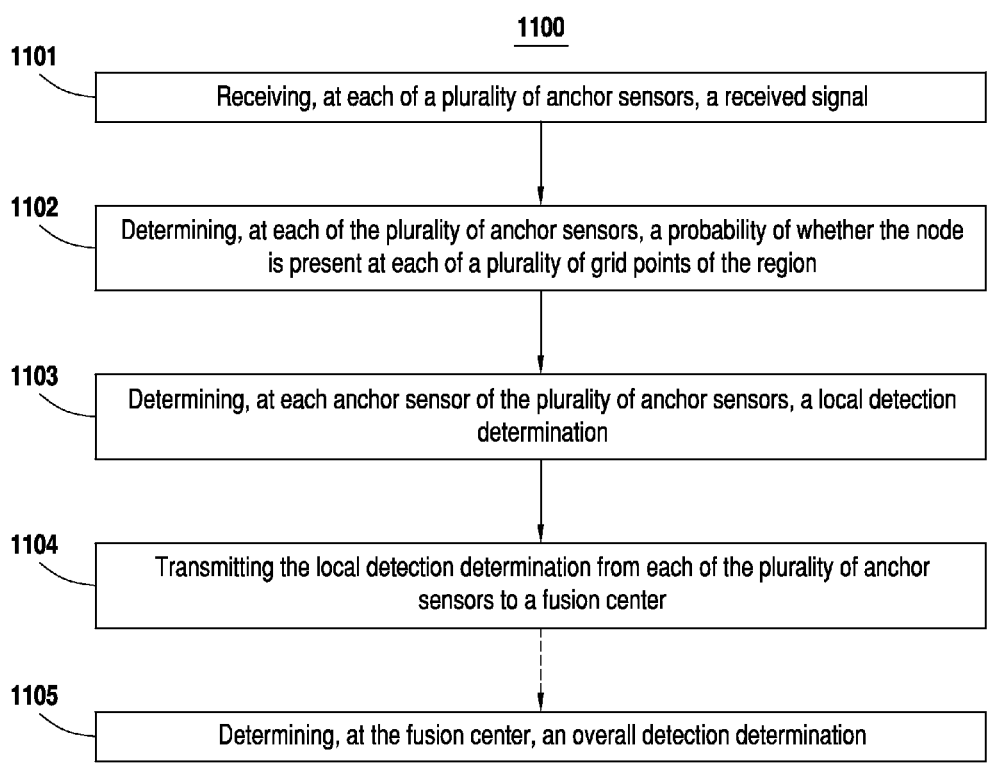
FIG. 11 illustrates a flowchart for a method of detecting the location of a node, according to an embodiment.

Turning ahead in the drawings, FIG. 11 illustrates a flow chart for a method 1100 of detecting the location of a node, according to an embodiment. Method 1100 is merely exemplary and is not limited to the embodiments presented herein. Method 1100 can be employed in many different embodiments or examples not specifically depicted or described herein. In some embodiments, the procedures, the processes, and/or the activities of method 1100 can be performed in the order presented. In other embodiments, the procedures, the processes, and/or the activities of method 1100 can be performed in any suitable order. In still other embodiments, one or more of the procedures, the processes, and/or the activities of method 1100 can be combined or skipped. The node can be similar or identical to sensor node device 121 (FIG. 1).

Referring to FIG. 11, in some embodiments, method 1100 can include block 1101 of receiving, at each of a plurality of anchor sensors, a received signal. The anchor sensors can be similar or identical to anchor sensors 111-113 (FIG. 1). The received signal can be similar or identical to $x_i[n]$. In some embodiments, the received signal can include noise and further can include a transmitted signal from the node when the node is transmitting the transmitted signal. The noise can be similar or identical to $\omega_i[n]$. The transmitted signal can be similar or identical to $s_i[n-n_j^i]$. In many embodiments, the node can be located at an exact location that is unknown to each of the plurality of anchor sensors. In several embodiments, the exact location can be in a region that is known to each of the plurality of anchor sensors. In various embodiments, the transmitted signal can be wirelessly transmitted from the node when the node is transmitting the transmitted signal.

In many embodiments, method 1100 additionally can include a block 1102 of determining, at each of the plurality of anchor sensors, a probability of whether the node is present at each of a plurality of grid points of the region. The probability of whether the node is present at each of the plurality of grid points of the region can be similar or identical to $P_D^j$. In various embodiments, the plurality of grid points can discretize the region to represent the region as a grid. In a number of embodiments, the plurality of grid points can be the same for each of the plurality of anchor sensors.

In several embodiments, method 1100 further can include a block 1103 of determining, at each of the plurality of anchor sensors, a local detection determination of whether the node is detected by the anchor sensor based at least in part on the probabilities of whether the node is present at the plurality of grid points. The local detection determination can be similar or identical to $H_0$ or $H_1$. In various embodiments, block 1103 of determining the local detection determination of whether the node is detected by the anchor sensor based at least in part on the probabilities that the node is present at the plurality of grid points can include determining that the node is present when the node is detected in at least one grid point of the plurality of grid points.

In some embodiments, a probability of detecting the node at an anchor sensor of the plurality of anchor sensors can be computed as follows: $P_D^i=1-(1-P_D^j)^R$, where $P_D^i$ is the probability of detecting the node at the anchor sensor (i), $P_D^j$ is the probability of detecting the node at the anchor sensor for a $j^{th}$ location of the plurality of grid points, and R is a quantity of the plurality of grid points.

In many embodiments, method 1100 additionally can include a block 1104 of transmitting the local detection determination from each of the plurality of anchor sensors to a fusion center. The fusion center can be similar or identical to fusion center 1330, as shown in FIG. 13 and described below.

In several embodiments, method 1100 optionally can include a block 1105 of determining, at the fusion center, an overall detection determination of whether the node is detected by the fusion center based at least in part on the local detection determinations received from the plurality of anchor sensors. In some embodiments, the overall detection determination determined by the fusion center can be based on whether a quantity of the plurality of anchor sensors that sent local detection determinations to the fusion center indicating that the node is detected is greater than a first threshold value. The first threshold value can be similar or identical to K.

Figure 12:
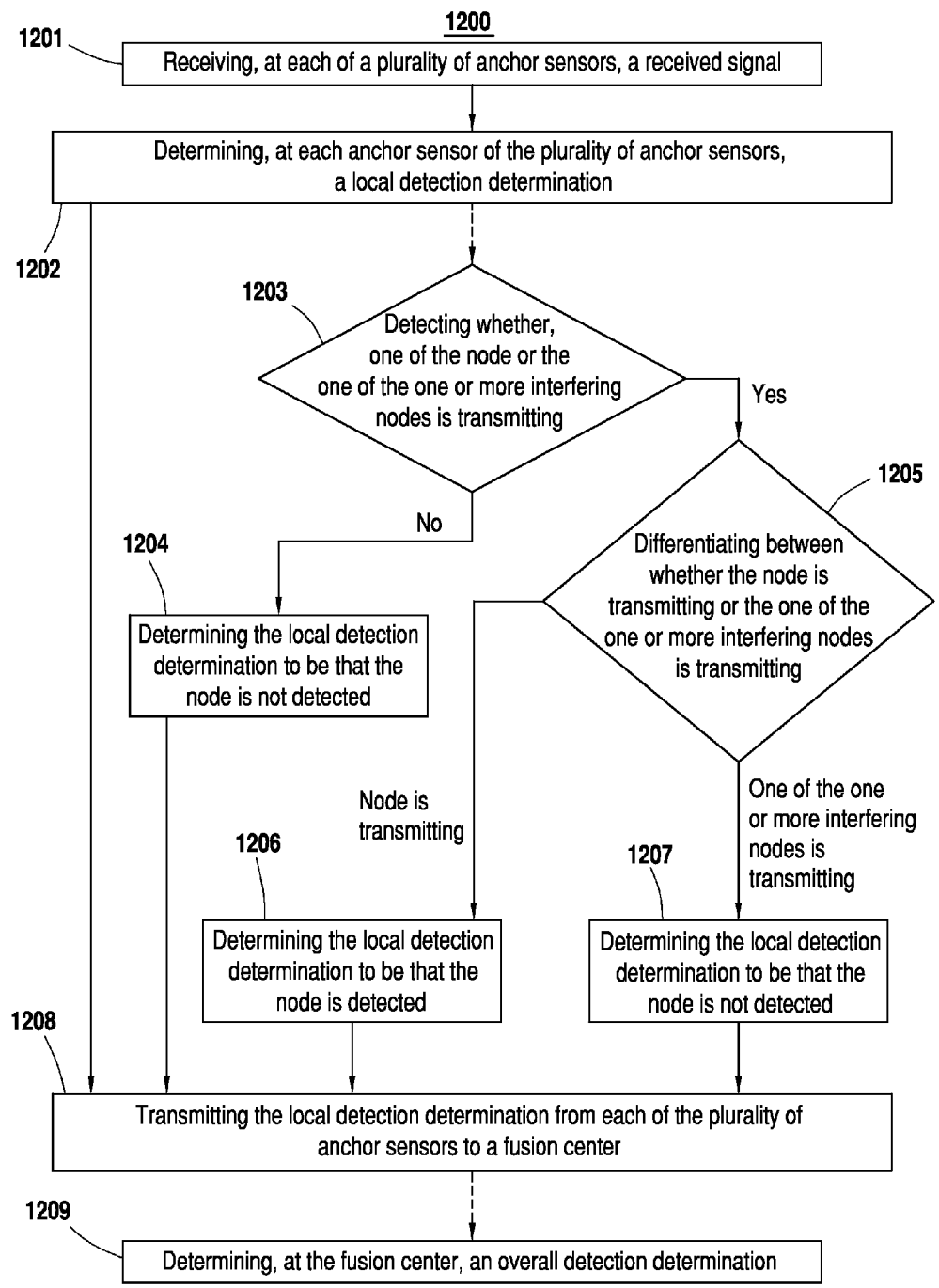
FIG. 12 illustrates a flowchart for a method of detecting the location of a node in the presence of one or more interfering nodes, according to an embodiment.

Turning ahead in the drawings, FIG. 12 illustrates a flow chart for a method 1200 of detecting the location of a node in the presence of one or more interfering nodes, according to an embodiment. Method 1200 is merely exemplary and is not limited to the embodiments presented herein. Method 1200 can be employed in many different embodiments or examples not specifically depicted or described herein. In some embodiments, the procedures, the processes, and/or the activities of method 1200 can be performed in the order presented. In other embodiments, the procedures, the processes, and/or the activities of method 1200 can be performed in any suitable order. In still other embodiments, one or more of the procedures, the processes, and/or the activities of method 1200 can be combined or skipped. The node can be similar or identical to sensor node device 121 (FIG. 1). The one or more interfering nodes can be similar or identical to sensor node devices 122-123 (FIG. 1).

Referring to FIG. 12, in some embodiments, method 1200 can include block 1201 of receiving, at each of a plurality of anchor sensors, a received signal. The received signal can be similar or identical to $x_i[n]$. In various embodiments, the received signal can include noise and further can include one of (a) a transmitted signal from the node when the node is transmitting the transmitted signal or (b) an interfering signal when the one of the one or more interfering nodes is transmitting. The anchor sensors can be similar or identical to anchor sensors 111-113 (FIG. 1). The noise can be similar or identical to $\omega_i[n]$. The transmitted signal can be similar or identical to $s_i[n-n_0^i]$. The interfering signal can be similar or identical to $s_i[n-n_j^i]$. In several embodiments, the node being located at an exact location that is known to each of the plurality of anchor sensors. In various embodiments, the one or more interfering nodes each can be located at an unknown location.

In several embodiments, method 1200 additionally can include a block 1202 of determining, at each of the plurality of anchor sensors, a local detection determination of whether the node is detected by the anchor sensor. The local detection determination can be similar or identical to $H_0$ or $H_1$.

In a number of embodiments, block 1202 of determining the local detection determination can include a block 1203 of detecting whether one of the node or the one of the one or more interfering nodes is transmitting. In some embodiments, block 1203 of detecting whether one of the node or the one of the one or more interfering nodes is transmitting can include determining whether a likelihood ratio of a correlation of the received signal and the transmitted signal exceeds a second threshold value. In various embodiments, block 1203 of detecting whether one of the node or the one of the one or more interfering nodes is transmitting can include determining whether a correlation of the received signal and the transmitted signal satisfies: $\Sigma_{n=\hat{n}_i}^{\hat{n}_i+L-1} x_i[n]s_i[n-\hat{n}_i]>\gamma_1$, where $\hat{n}_i$ is the estimated time delay, L is a length of the transmitted signal, $x_i[n]$ is the received signal, $s_i[n-\hat{n}_i]$ is transmitted signal, and $\gamma_i$ is a second threshold value.

In several embodiments, if the one of the node or the one of the one or more interfering nodes is not detected to be transmitting, block 1202 of determining the local detection determination can include a block 1204 of determining the local detection determination to be that the node is not detected, or $H_0$.

In many embodiments, if the one of the node or the one of the one or more interfering nodes is detected to be transmitting, block 1202 of determining the local detection determination can include blocks 1205-1207, described below.

Specifically, block 1202 can include a block 1205 of differentiating between whether the node is transmitting or the one of the one or more interfering nodes is transmitting, based on an estimated time delay. In some embodiments, differentiating between whether the node is transmitting or the one of the one or more interfering nodes is transmitting can include comparing the estimate time delay with a time delay between the anchor node and the node. For example, the comparison can be similar or identical to equation 16, described above.

In several embodiments, if the node is detected to be transmitting in block 1205, block 1202 can include a block 1206 of determining the local detection determination to be that the node is detected, or $H_1$.

In many embodiments, if the one or more one or more interfering nodes is detected to be transmitting, block 1205 can include a block 1207 of determining the local detection determination to be that the node is not detected, or $H_0$.

In several embodiments, block 1200 can include a block 1208 of transmitting the local detection determination from each of the plurality of anchor sensors to a fusion center. The fusion center can be similar or identical to fusion center 1330, as shown in FIG. 13 and described below.

In some embodiments, block 1200 optionally can include a block 1209 of determining, at the fusion center, an overall detection determination of whether the node is detected by the fusion center based at least in part on the local detection determinations received from the plurality of anchor sensors. In a number of embodiments, the overall detection determination determined by the fusion center can be based on whether a quantity of the plurality of anchor sensors that sent local detection determinations to the fusion center indicating that the node is detected is greater than a first threshold value. The first threshold value can be similar or identical to K.

Turning ahead in the drawings, FIG. 13 illustrates a block diagram of various components and/or modules of anchor sensor 111 and fusion center 1330, according to an embodiment. In a number of embodiments, anchor sensors 112-113 (FIG. 1) can be similar or identical to anchor sensor 111. Anchor sensor 111 and fusion center 1330 are merely exemplary, and embodiments or the anchor sensor and fusion center are not limited to the embodiments presented herein. Anchor sensor 111 and fusion center 1330 can be employed in many different embodiments or examples not specifically depicted or described herein. In some embodiments, certain elements or modules of anchor sensor 111 and/or fusion center 1330 can perform various procedures, processes, and/or acts. In other embodiments, the procedures, processes, and/or acts can be performed by other suitable elements or modules.

In many embodiments, anchor sensor 111 can include a signal receiver 1311. In a number of embodiments, signal receiver 1311 can be a wireless receiver. In several embodiments, signal receiver 1311 can at least partially perform block 1101 (FIG. 11) of receiving, at each of a plurality of anchor sensors, a received signal, and/or block 1201 (FIG. 12) of receiving, at each of a plurality of anchor sensors, a received signal.

In a number of embodiments, anchor sensor 111 can include a determination module 1312. In several embodiments, determination module 1312 can at least partially perform block 1102 (FIG. 11) of determining, at each of the plurality of anchor sensors, a probability of whether the node is present at each of a plurality of grid points of the region, block 1103 (FIG. 11) of determining, at each of the plurality of anchor sensors, a local detection determination of whether the node is detected by the anchor sensor based at least in part on the probabilities of whether the node is present at the plurality of grid points, block 1202 (FIG. 12) of determining, at each of the plurality of anchor sensors, a local detection determination of whether the node is detected by the anchor sensor, block 1203 (FIG. 12) of detecting whether one of the node or the one of the one or more interfering nodes is transmitting, block 1204 (FIG. 12) of determining the local detection determination to be that the node is not detected, block 1205 (FIG. 12) of differentiating between whether the node is transmitting or the one of the one or more interfering nodes is transmitting, based on an estimated time delay, block 1206 (FIG. 12) of determining the local detection determination to be that the node is detected, and/or block 1207 (FIG. 12) of determining the local detection determination to be that the node is not detected.

In various embodiments, anchor sensor 111 can include a transmitter 1313. In a number of embodiments, transmitter 1313 can be a wireless transmitter. In several embodiments, transmitter 1313 can at least partially perform block 1104 (FIG. 11) of transmitting the local detection determination from each of the plurality of anchor sensors to a fusion center, and/or block 1208 (FIG. 12) of transmitting the local detection determination from each of the plurality of anchor sensors to a fusion center.

In many embodiments, fusion center 1330 can include a receiver 1331. In a number of embodiments, receiver 1331 can be a wireless receiver. In several embodiments, receiver 1331 can at least partially perform receiving local detection determinations sent in block 1104 (FIG. 11) of transmitting the local detection determination from each of the plurality of anchor sensors to a fusion center, and/or block 1208 (FIG. 12) of transmitting the local detection determination from each of the plurality of anchor sensors to a fusion center.

In various embodiments, fusion center 1330 can include a determination module 1332. In several embodiments, determination module can at least partially perform block 1105 (FIG. 11) of determining, at the fusion center, an overall detection determination of whether the node is detected by the fusion center based at least in part on the local detection determinations received from the plurality of anchor sensors, and/or block 1209 (FIG. 12) of determining, at the fusion center, an overall detection determination of whether the node is detected by the fusion center based at least in part on the local detection determinations received from the plurality of anchor sensors.

Although this disclosure has been described with reference to specific embodiments, it will be understood by those skilled in the art that various changes may be made without departing from the spirit or scope of the invention. Accordingly, the disclosure of embodiments of maximum likelihood localization in the presence of channel uncertainties is intended to be illustrative of the scope of the invention and is not intended to be limiting. It is intended that the scope of the invention shall be limited only to the extent required by the appended claims. For example, to one of ordinary skill in the art, it will be readily apparent that any element of FIGS. 1-13 may be modified, and that the foregoing discussion of certain of these embodiments does not necessarily represent a complete description of all possible embodiments. For example, one or more of the procedures, processes, or activities of FIGS. 2 and 11-12 may include different procedures, processes, and/or activities and be performed by many different modules, in many different orders, and/or one or more of the procedures, processes, or activities of FIGS. 2 and 11-12 may include one or more of the procedures, processes, or activities of another different one of FIGS. 2 and 11-12.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A wireless sensor network system for detecting a location of a node, the wireless sensor network system comprising:
    a plurality of anchor sensors each comprising:
        a signal receiver configured to detect a received signal, the received signal comprising noise and further comprising a transmitted signal from the node when the node is transmitting the transmitted signal, the node being located at an exact location that is unknown to each of the plurality of anchor sensors, the exact location being in a region that is known to each of the plurality of anchor sensors, and the transmitted signal being wirelessly transmitted from the node when the node is transmitting the transmitted signal;
        a processing module; and
        a transmitter; and
    a fusion center,
    wherein:
        the processing module of each anchor sensor of the plurality of anchor sensors performs:
            determining a probability of whether the node is present at each of a plurality of grid points of the region; and
            determining a local detection determination of whether the node is detected by the anchor sensor based at least in part on the probabilities of whether the node is present at the plurality of grid points;
        the transmitter of each anchor sensor of the plurality of anchor sensors sends the local detection determination from the anchor sensor to the fusion center; and
        a probability of detecting the node at an anchor sensor (i) of the plurality of anchor sensors is computed as follows:

$$P_D^i = 1 - (1 - P_D^j)^R,$$

where $P_D^i$ is a probability of detecting the node at the anchor sensor (i), $P_D^j$ is a probability of detecting the node at the anchor sensor (i) for a $j^{th}$ location of the plurality of grid points, and R is a quantity of the plurality of grid points.

2. The wireless sensor network system of claim 1, wherein:
    the fusion center is configured to determine an overall detection determination of whether the node is detected by the fusion center based at least in part on the local detection determinations received from the plurality of anchor sensors.

3. The wireless sensor network system of claim 2, wherein:
    the overall detection determination determined by the fusion center is based on whether a quantity of the plurality of anchor sensors that sent local detection determinations to the fusion center indicating that the node is detected is greater than a first threshold value.

4. The wireless sensor network system of claim 1, wherein:
    the plurality of grid points discretizes the region to represent the region as a grid.

5. The wireless sensor network system of claim 1, wherein:
    the plurality of grid points are the same for each of the plurality of anchor sensors.

6. The wireless sensor network system of claim 1, wherein:
    determining the local detection determination of whether the node is detected by the anchor sensor based at least in part on the probabilities that the node is present at the plurality of grid points comprises determining that the node is present when the node is detected in at least one grid point of the plurality of grid points.

7. A method for detecting a location of a node, the method comprising:
    receiving, at each of a plurality of anchor sensors, a received signal, the received signal comprising noise and further comprising a transmitted signal from the node when the node is transmitting the transmitted signal, the node being located at an exact location that is unknown to each of the plurality of anchor sensors, the exact location being in a region that is known to each of the plurality of anchor sensors, and the transmitted signal being wirelessly transmitted from the node when the node is transmitting the transmitted signal;
    determining, at each of the plurality of anchor sensors, a probability of whether the node is present at each of a plurality of grid points of the region;
    determining, at each of the plurality of anchor sensors, a local detection determination of whether the node is detected by the anchor sensor based at least in part on the probabilities of whether the node is present at the plurality of grid points; and
    transmitting the local detection determination from each of the plurality of anchor sensors to a fusion center,
    wherein:
        a probability of detecting the node at an anchor sensor (i) of the plurality of anchor sensors is computed as follows:

$$P_D^i = 1 - (1 - P_D^j)^R,$$

where $P_D^i$ is the probability of detecting the node at the anchor sensor (i), $P_D^j$ is the probability of detecting the node at the anchor sensor (i) for a $j^{th}$ location of the plurality of grid points, and R is a quantity of the plurality of grid points.

8. The method of claim 7, further comprising:
    determining, at the fusion center, an overall detection determination of whether the node is detected by the fusion center based at least in part on the local detection determinations received from the plurality of anchor sensors.

9. The method of claim 8, wherein:
    the overall detection determination determined by the fusion center is based on whether a quantity of the plurality of anchor sensors that sent local detection determinations to the fusion center indicating that the node is detected is greater than a first threshold value.

10. The method of claim 7, wherein:
the plurality of grid points discretizes the region to represent the region as a grid.

11. The method of claim 7, wherein:
the plurality of grid points are the same for each of the plurality of anchor sensors.

12. The method of claim 7, wherein:
determining the local detection determination of whether the node is detected by the anchor sensor based at least in part on the probabilities that the node is present at the plurality of grid points comprises determining that the node is present when the node is detected in at least one grid point of the plurality of grid points.

\* \* \* \* \*